(12) United States Patent
Edwards

(10) Patent No.: US 8,286,868 B2
(45) Date of Patent: Oct. 16, 2012

(54) CHECKOUT METHODS AND APPARATUS

(75) Inventor: Thomas V. Edwards, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 114 days.

(21) Appl. No.: 12/874,308

(22) Filed: Sep. 2, 2010

(65) Prior Publication Data

US 2012/0055982 A1 Mar. 8, 2012

(51) Int. Cl.
*G06K 15/00* (2006.01)
(52) U.S. Cl. .......................................... 235/383; 235/385
(58) Field of Classification Search .................. 235/375, 235/383, 385
See application file for complete search history.

(56) References Cited

U.S. PATENT DOCUMENTS

| | | | |
|---|---|---|---|
| 6,286,758 B1 | 9/2001 | Dejaeger et al. |
| 6,712,268 B1 | 3/2004 | Mason et al. |
| 7,466,231 B1 | 12/2008 | Seevers |
| 7,533,799 B2 | 5/2009 | Edwards |
| 7,575,162 B1 | 8/2009 | Malchak et al. |
| 7,620,568 B1 | 11/2009 | Parker-Malchak |
| 7,673,796 B2 | 3/2010 | Kobres et al. |
| 7,673,797 B2 | 3/2010 | Edwards |

*Primary Examiner* — Daniel Hess
(74) *Attorney, Agent, or Firm* — Peter Priest; Paul W. Martin

(57) ABSTRACT

Item characteristic databases, such as item weight databases are employed in a variety of checkout contexts in stores. As one example, a security weight database is often employed in a security check during self-checkout in which an item's weight is checked during bagging against a stored weight for the item. Approaches for extending such security checks for a single item or items sold in small quantities are addressed.

20 Claims, 6 Drawing Sheets

FIG. 3

| SPECIFIC ITEMS | AVERAGE WEIGHT ($W_{AVE}$) | ALLOWABLE DEVIATION ($\pm W_{DEV}$) |
|---|---|---|
| ITEM 1 | 1.0 | .05 |
| ⋮ | ⋮ | ⋮ |
| ITEM N | 20.0 | 1.0 |
| SPECIFIC CATEGORIES | | |
| CATEGORY 1 | | |
| ⋮ | | |
| BLOUSES | .25 | .10 |
|   BLOUSE - ADULT | .25 | .05 |
|   BLOUSE - JUNIORS | .20 | .05 |
| ⋮ | | |
| JEANS | 1.25 | .75 |
|   JEANS - EXTRA LARGE | 1.75 | .25 |
|   JEANS - MEDIUM | 1.25 | .25 |
|   JEANS - SMALL | .75 | .25 |
|     MENS - JEANS - SMALL | .90 | .15 |
|     WOMENS - JEANS - SMALL | .80 | .15 |
| ⋮ | | |
| PLANT | 3.0 | 1.0 |
| ⋮ | | |
| CATEGORY N | | |
| ⋮ | | |
| ABSTRACT CATEGORIES | | |
| CATEGORY 1 | | |
| ⋮ | | |
|   WEIGHS - 0.75 - TIGHT TOLERANCE | .75 | .0375 |
|   WEIGHS - 0.75 - LOOSE TOLERANCE | .75 | .075 |
| ⋮ | | |
|   WEIGHS - 1.75 - TIGHT TOLERANCE | 1.75 | .0875 |
|   WEIGHS - 1.75 - LOOSE TOLERANCE | 1.75 | .175 |
| ⋮ | | |
| CATEGORY N | | |

CHECKOUT METHODS AND APPARATUS

FIELD OF THE INVENTION

The present invention relates generally to improved methods and apparatus for checkout and self-checkout, and more particularly, to advantageous techniques for establishing an item characteristic, such as weight for an item or items which are sold individually or in small numbers to be used in a security check or the like.

BACKGROUND OF THE INVENTION

Retail items are sold in a variety of different ways. For example, a barcode on an item to be sold is scanned by a barcode scanner and the price is looked up in a price look-up (PLU) table. A point of sale (POS) terminal builds up a list of items and prices as items are scanned and a total price and itemized receipt are generated in a known manner. Other items are sold by weight, quantity, length or the like.

As an example of items sold by weight, item price information is commonly embedded in barcodes for applications such as deli products, such as meat, cheese and the like. Alternately, the weight of an item is sometimes embedded within the item barcode for purposes of price determination. For example, red delicious apples may be $1.59 a pound and a barcode may indicate that a bag is 5 pounds so that the ultimate price is determined by multiplying 5 pounds×$1.59/pound.

A wide variety of self-checkout apparatus and solutions have been proposed and adopted over the past decade or so. See, for example, U.S. Pat. Nos. 6,286,758; 7,466,231; 7,575,162; 7,533,799; 7,620,568; 7,673,796; and 7,673,797, all of which are assigned to the assignee of the present invention and incorporated by reference herein in their entirety.

Weight checks may be employed in a variety of contexts as security checks and to prevent fraud. As one example, in a service aided checkout environment, a weight of an item may be checked to prevent a service person assisted fraud where one item is scanned and another more expensive item is bagged, a customer swapping one bar code label removed from a less expensive item for another from a more expensive item, a customer substituting a customer generated bar code, or the like.

In self-checkout, one typical self-service terminal includes security systems that monitor the operation of the terminal and the activities of the customer. For example, a security weight scale or weight scales are incorporated into the terminal to monitor the total weight of the items brought by the customer to the terminal or the total weight of the items placed in a grocery or shopping bag. In such security systems, a software routine is executed by a computer or processor associated with the terminal that analyzes the signal output from the security weight scale, as well as, other user-interfaces of the terminal. One typical software routine compares the weight of each item as it is scanned with a database of expected weight values. Any discrepancy results in the generation of an error message and a pause in the checkout routine until the customer or store personnel takes appropriate corrective action, such as re-scanning the merchandise. A weight error signal may result in intervention by store personnel to clear up the problem.

In one weight verification routine, weight signals from a security scale are verified against a weight for each scanned product where the mean weight $M_n$ of each product or item 1 through item n available in the store is stored in a database along with a weight standard deviation $SD_n$ for each item. As an item is scanned by the scanner and placed on a scale, the weight measured at the scale is compared to a weight range calculated from the mean and standard deviation data extracted from the database for that item. If the weight falls within a calculated range $M_n \pm$the standard deviation $SD_n$ (optionally multiplied by an arbitrary constant A), the entry is accepted. If the weight falls outside this range, the entry is rejected. In the self-checkout context, the customer is instructed to re-scan and/or re-weigh the item. In addition, in some terminals, a weight error is communicated to a store attendant as part of the terminal security measures. The routine continuously updates the mean weight and standard deviation values for each item with each new accepted observation of the weight of that item.

As further described in U.S. Pat. Nos. 7,620,568 and 6,712,268 assigned to the assignee of the present application, and incorporated by reference herein in their entirety, a memory containing a weight learning database (WLDB) may be suitably employed. The WLDB contains a predetermined weight for items to be weighed and can learn the weights of each item from a series of weighings of the item. Commonly such learning systems are unable to apply security the first few times a new item is sold because the characteristic weight and variance have not been determined. When the inventory count of items is large and re-occurring week to week, the inability to provide weight characteristic checking for the first few times the item is sold is not significant.

SUMMARY OF THE INVENTION

Among its several aspects, the present invention recognizes that in several contexts an improved method of updating an item characteristic database, such as a weight database may be desirable. For example, where a store sells individual items, one of a kind, or a few of a kind, as in the case of an odd lot, it may not be desirable or feasible from a cost standpoint to have an employee directly update the database. Similarly, a typical weight learning database designed to learn item weight averages and variances using algorithms requiring repeated observation of the item weight as the item is sold numerous times will not work for "odd-lot" items sold only a few times and never "learned" by the security system resulting in no security enforcement for such items. In such contexts, it may still be advantageous to have an item weight for a security check or the like. To such ends, an aspect of the present invention addresses systems and methods to employ bar codes or electronic article surveillance (EA) tags in connection with radio frequency identification (RFID) tags which are applied to an item at the time of pricing or displaying the item to identify a specific category, an abstract category, a weight or weight range for such items as addressed in greater detail below.

Among its several aspects, the present invention allows checkout and self-checkout weight based item security to be effectively and efficiently utilized by a previously underserved class of retailers that deal in odd-lot sales, inventory with small populations, or non-repeating inventory where items can be readily assigned categories representing expected weights. Examples of such retailers are ROSS, Odd-Lots, Dollar Tree and thrift stores where conventional item weight learning by repeated observation is not practical for all items sold.

To such ends, an item weight category or sub-category may be associated with an item by embedding it within the item barcode. Alternatively or additionally, reusable RFID enabled EAS tags may be employed in outlets with high percentages of hand-tagged items. The introduction of such systems can be advantageously merged into the existing price/tagging operation performed by the retailer with little or no additional effort.

A more complete understanding of the present invention, as well as further features and advantages of the invention, will be apparent from the following Detailed Description and the accompanying drawings.

BRIEF DESCRIPTION OF THE DRAWINGS

FIG. 3 is an example of an extended weight learning database in accordance with the present invention;

FIG. 5 shows a first process in accordance with the present invention for expanding a weight database to include one off, unique, small volume items, and the like;

FIG. 6 shows a second process in accordance with the present invention for expanding a weight database to include one off, unique, small volume items, and the like; and FIG. 7 shows a third process in accordance with the present invention for expanding a weight database to include one off, unique, small volume items, and the like.

DETAILED DESCRIPTION

Figure 1:
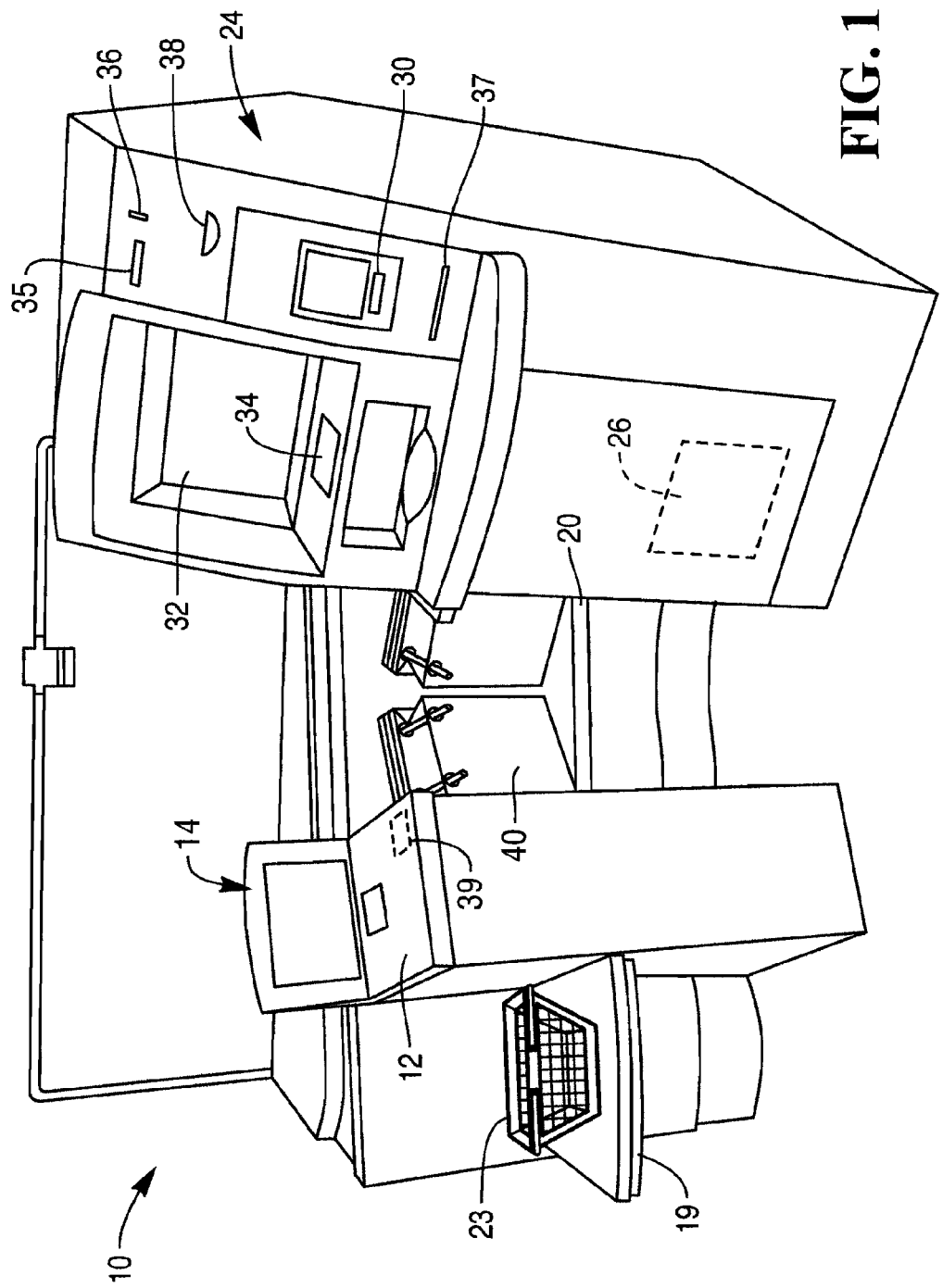
FIG. 1 is a perspective view of a checkout system modified in accordance with the present invention to apply an expanded weight database in accordance with the present invention.

As discussed above, a traditional self-checkout system may use an item weight based security system where the measured weight of each purchased item is compared against a library or database of allowable weights for that item. The allowable weight is often learned over repeated observations of the item, possibly at a checkout station, the store level or optionally across stores. This approach works fine for items that persist in the store inventory in significant numbers for long periods such as a can of soup, a bottle of dishwashing liquid or the like, but creates a problem for retailers with small numbers of unique inventory items that do not exist in sufficient numbers to allow conventional weight learning of this type to occur.

The present invention addresses such issues by recognizing the existence of item categories in retail stores that allow the items expected weight to be assigned during the pricing or tagging of the items, establishing such item categories in the security weight database, and then reading the weight for the category upon checkout rather than learning based on the repeated weighing of the item.

For example, a retailer may sell odd-lots of clothing. This inventory may be one-of-a-kind, or few-of-a-kind only. According to one aspect of the present invention, when the item is priced, the retailer also assigns a weight category to the item such as "blouse-juniors" or "jeans" which associates an allowable weight range for the item. The item category weight expectation may be broad enough to handle all size variations, or sub-categories can be defined corresponding to different weights within the category such as "jeans-small" and "jeans-extralarge". The categories can be further subdivided if required as "mens-jeans-small" and "womens-jeans-small", for example.

Abstract weight categories may also be defined as might be desirable in the case of two vases where one weighs 0.75 lbs and the other weighs 1.75 lbs. In this case, abstract categories can be defined for items with these specific weights such as "weighs_0.75" and "weighs_1.75". It will be recognized that it is not important how many categories exist or what these category definitions are based on. Thus, the present approach has the advantage of being highly flexible.

Categories can also advantageously have different tolerance allowances. For example, if a category is intended to handle multiple clothing sizes, it may require a larger category variance than a category that does not vary much, such as a pint of liquid.

Another example might be a plant that nominally weighs 3.0 lbs. Depending on how recently the plant was watered, the selling weight could range from 2.0-4.0 lbs. The allowable weight deviation can likewise be attached to the category description such as "plant_3 lb" that will allow a weight range from 2 to 4 lbs.

The assignment of the item weight category can be done efficiently at the time the item is priced either by recognizing an existing item category or by weighing the item and assigning an abstract category based only on weight, or based on weight and weight variation.

In order to implement such a system, the item category is communicated to the self-checkout system at the time the item is purchased. The item category can be provided to the self-checkout as a byproduct of the sales operation, or determined by information read from the item being sold.

The item category can be provided as a byproduct of the sales operation when the sales engine responsible for converting the item scan code into a price, taxes and benefits for use by the self-checkout is able to determine the item category as well. This could be an extension of the typical capability of the sales engine to determine the department of the item sold. Departments are commonly hierarchical and represented as department.subdepartment.subdepartment; etc. For example, mensware.formal.suits could be expanded to provide additional weight category information such as "Mensware.formal.suits.2piece.wool.extralarge". In this case the sales engine has been extended to supply the category information required for weight validation as an extension to the existing department assignment done for all inventory items.

Alternately, the item category can be determined by the self-checkout system by reading and processing the observable information from the item, for example the item barcode, RFID tag; or intrinsic to the item such as its shape, size, color, texture, smell or a combination thereof.

This approach minimizes or eliminates the need for extensions to the sales engine for passing item category information to the self-checkout. One specific approach encodes the item category information into the item barcode. Several barcode symbologies, including Code 128 and Code 39, allow the inclusion of arbitrary information within the item barcode. This approach may be employed to implement an abstract weight category or a specific item category. Such barcoded information can be stripped out by the self-checkout system for use by the item security subsystem. In one approach, the barcode provides the category information while the security system maintains the expected weight range details. Alternately, the barcode can provide a specific weight, or embedded price from which weight can be determined, as is commonly done for deli products such as sliced meat. Unlike the use of such information in the check out of deli products, the present invention employs the weight information for comparison with a weight from a security scale as part of the security process.

Figure 2:
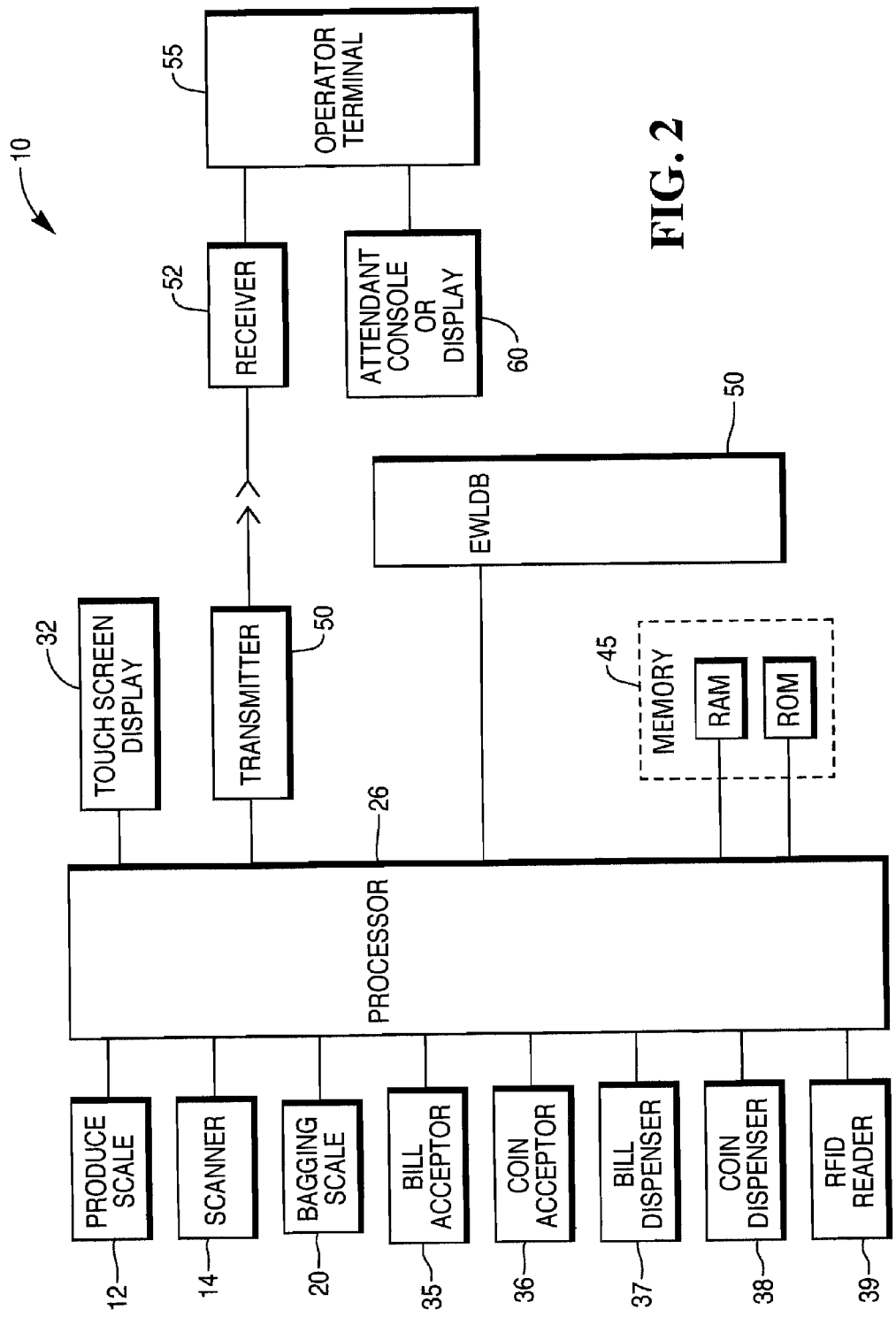
FIG. 2 is a block diagram of part of a control circuit for the checkout system of FIG. 1.

Turning to the drawings, FIG. 1 shows a self-checkout terminal 10 that may be suitably used in a supermarket or retail setting. The terminal 10 includes a product weight scale 12, such as a produce scale, and a scanner 14 associated with the scale. A bagging or security scale 20 is provided adjacent the scanner to support shopping bags into which the customer places each newly scanned item. The terminal 10 includes a basket scale 19 configured to support a shopping basket 23 full of products. Each of the scales 12, 19 and 20 include at least one weight detector, such as a pressure sensor or a load cell sensor, which is operable to generate a signal in response to the weight of the item placed on the scale. A kiosk 24 includes a display 32, data input device 34 and a payment device 30, as well as, a bill acceptor 35, coin acceptor 36, bill dispenser 37 and coin dispenser 38. An RFID tag reader 39 is incorporated within scale 12. A computer or processor 26 is resident within the terminal 10 and executes various software routines associated with the self-checkout process. In particular, processor 26 executes software implementing processes, such as the processes of FIGS. 5-7, for example, as discussed further below in connection with FIG. 2.

The present invention adds new intelligence to the self-checkout application software making it capable of operating in conjunction with an expanded weight database. As seen in the simplified FIG. 2 which shows illustrative components relative to expanded weight database operation. Processor 26 receives inputs from scale 12, scanner 14, bagging scale 20, bill acceptor 35, coin acceptor 36, bill dispenser 37, coin dispenser 38, an RFID reader 39, and an expanded weight database 50. It provides outputs to drive touch screen display 32. It has software memory 45 storing software which when executed controls the processor 26 to perform the methods and processes described further herein. It also wirelessly transmits an output to a receiver 52 of an operator terminal 55 which when received by terminal 55 causes that terminal to drive operator console or display 60 to alert an operator to potential problems. It will be recognized that alternatively or additionally an audio notification can be employed and a red or other light can light at self-checkout terminal 10 to further guide the attendant to the problem. Operator terminal 55 and console 60 are remote from the self-checkout terminal 10. In a typical store arrangement, a group of terminals 10 is overseen by a single attendant from an attendant station.

In one example of expanded weight database operation, a customer scans a barcode on an item, such as a pair of jeans utilizing the scanner 14. In this example, the jeans are from an odd lot of merchandise that the store does not carry regularly so that a standard weight learning database may not have seen these jeans before or the number of jeans may be too small to learn their weight in the typical fashion.

Thus, in accordance with the present invention the self-checkout terminal 10 employs an extended weight learning database (EWLDB) 300 which may suitably be employed as the expanded weight database 50. Details of an example EWLDB 300 are shown in FIG. 3. As seen in FIG. 3, EWLDB 300 includes entries for "Specific Items" 310, item 1 . . . item N, which are sold on a regular basis and in large numbers, such as canned soup, boxed cereal, soft drinks and the like, so that it may be cost effective to enter the items directly into the database by a store employee, or they may be learned on an ongoing basis as they are repeatedly weighed. As illustrated in FIG. 3, each item has an average weight ($W_{AVE}$) and an allowable deviation ($\pm W_{DEV}$). This portion of FIG. 3 corresponds to or represents known weight databases.

EWLDB 300 further includes "Specific Categories" 320, category 1 . . . category N. Within these categories 1-N, several illustrative named categories are included to illustrate several aspects of the invention, specifically, blouses 322 with the subcategories blouse_adult 323 and blouse_juniors 324; jeans 326 with sub_categories, jeans_extra large 327, jeans medium 328 and jeans_small 329, and the sub_sub-categories, mens jeans_small 331 and womens_jeans_small 332; and plant 334.

As seen for the overall category of jeans 326, that category allows a wider tolerance, than its sub-categories which in turn have a wider tolerance than the sub-sub-categories. By way of example, an odd-lot of low cost jeans might be simply classifies all together in jeans 326 whereas varied pairs of high cost designer jeans of small sizes might be categorized by sub-sub -category to be able to prevent an unscrupulous customer or thief from switching a label from the low cost jeans to the high cost designer jeans.

To use such categories, a stock person or other store employee given the task of attaching price labels or displaying the items in question can printout a barcoded price label which includes the category information encoded therein. To this end, in addition to entering the price into a label maker, the employee enters category identification information as well.

EWLDB 300 additionally includes "Abstract Categories" 340, category 1 . . . category N. Within these categories are several illustrative examples, weighs_0.75_tight tolerance 342, weighs_0.75_loose tolerance 343, weighs_1.75_tight tolerance 344, and weighs_1.75_loose tolerance. The store employee can either weigh the item, or if the weight is known from a product tag or the like, can then enter the correct abstract category 340 into the price label maker Scale 12 produces a weight signal which is output to the processor 26. Display 32 may then prompt the customer to place the item into a bag which sits on the bagging scale 20. Where the jeans are the first item, the weight is compared with the weight from scale 12. Where the jeans are a subsequent item, the change in weight resulting from bagging the jeans is output by the bagging scale 20 or the processor 26 determines the resulting difference. In either case, if the weights from scales 12 and 20 differ by more than a predetermined amount, the processor determines that a weight mismatch has occurred and notifies the attendant to intervene to correct the condition. Similarly, the weight from EWDLB 300 is compared to a security sale output and a weight mismatch can be dealt with appropriately.

Figure 4:
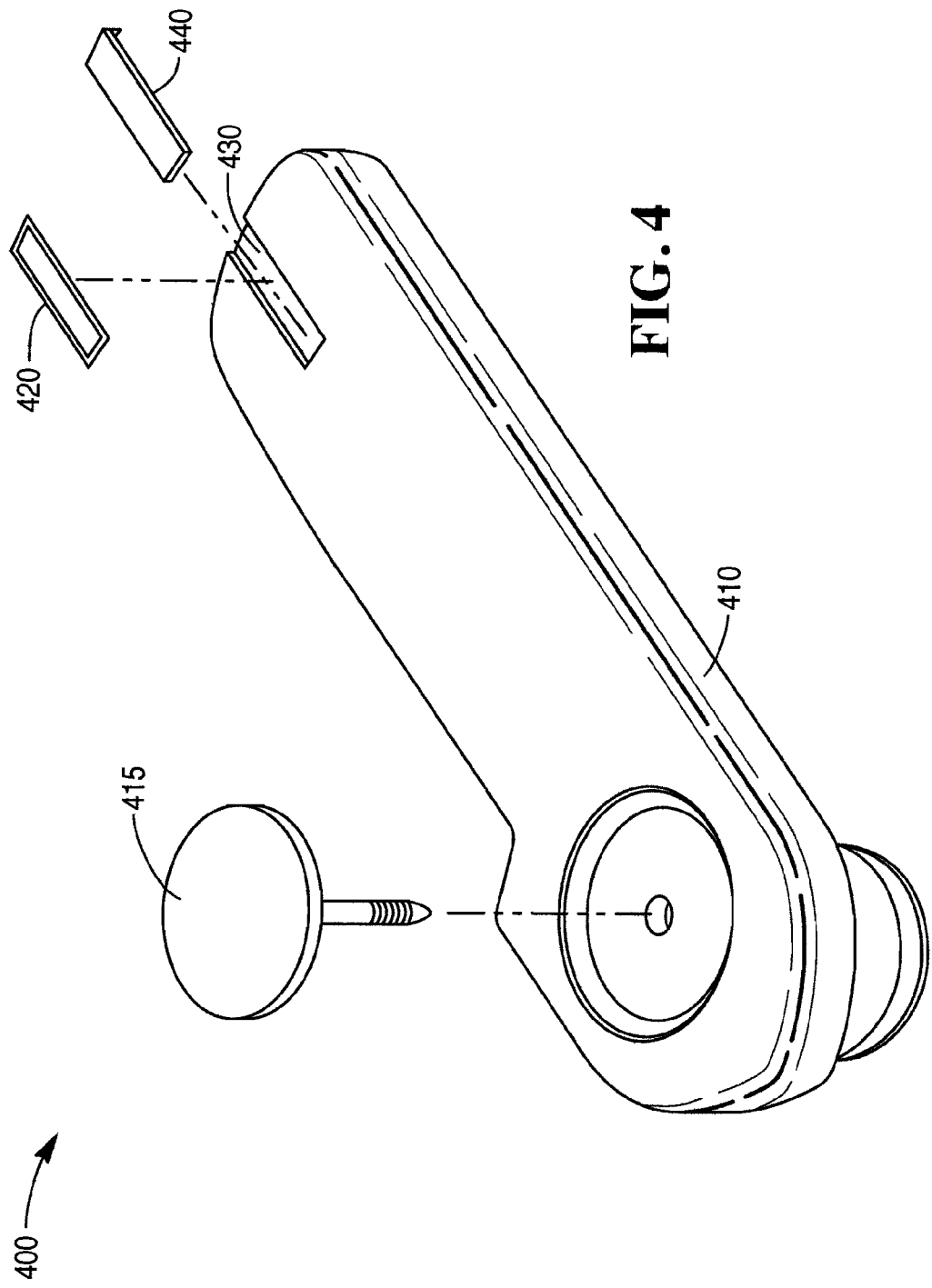
FIG. 4 is a perspective view of a reusable RFID enabled EAS tag in accordance with the present invention.

Another variation for utilizing item category information applicable to retailers who use a high percentage of EAS hard tags is provided by the present invention through the combination of RFID tag technology with EAS hard tag technology as illustrated in FIG. 4. Although RFID tags remain above the cost point where they can be considered disposable, it appears practical to embed RFID tags into EAS hard tags commonly used to protect garments such that the embedded RFID tags effectively become "reusable". This reuse occurs naturally because the garment tags must be removed by an attendant before the garment leaves the store. The provision of an RFID tagged EAS hard tag 400 as shown in FIG. 4 presents an alternative to embedding the item category code into a barcode. Instead, an EAS hard tag 410 with a unique RFID tag 420 associated with an item weight category is attached to the garment with locking pin 415 as the garment is readied for display. As seen in FIG. 4, RFID tag 420 fits in slot 430 and is covered by a slidable cover. If the RFID tag 420 stores a code for a category identifier, that information is read using an RFID reader, such as RFID reader 39 of FIGS. 1 and 2. A database such as the database 300 is then used to obtain the category weight for the category read from the RFID tag 420 required for self-checkout item security. Alternatively, the RFID tag may store the associated item's weight directly. In this case, the stored weight includes the weight of the hard tag itself. Upon completion of self-checkout, items with EAS tags are taken to the attendant for removal.

Figure 5:
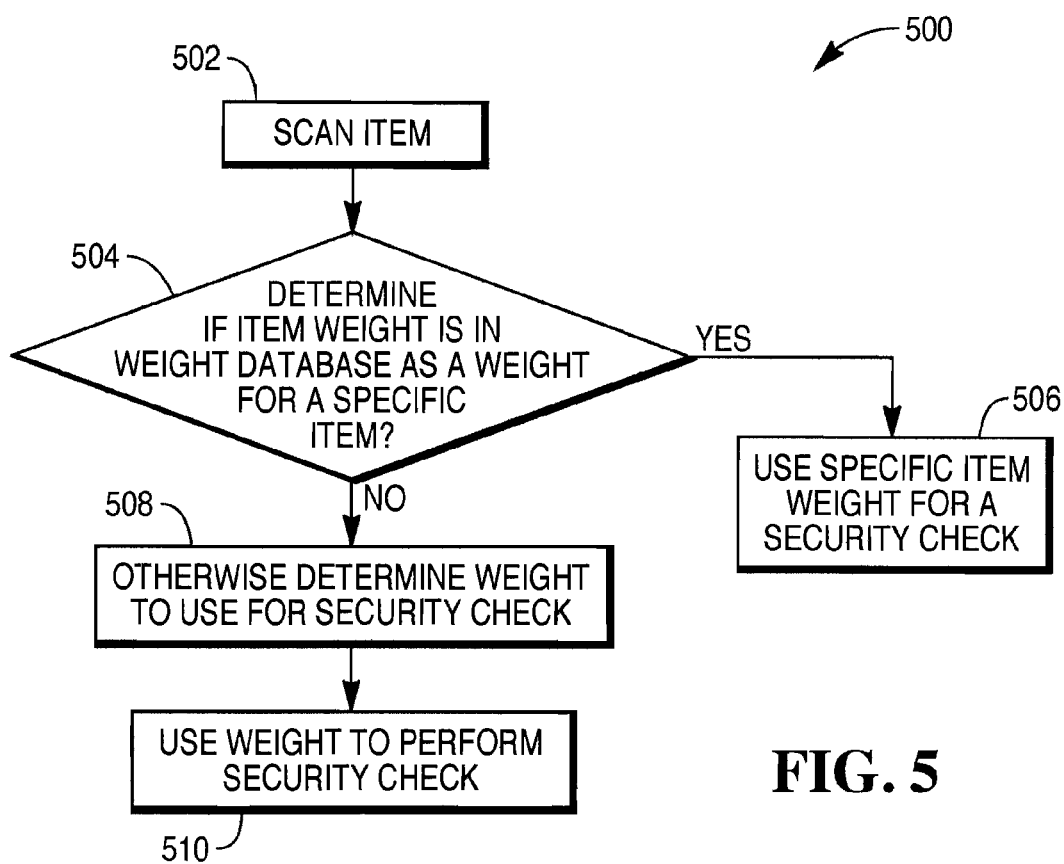
Figure 6:
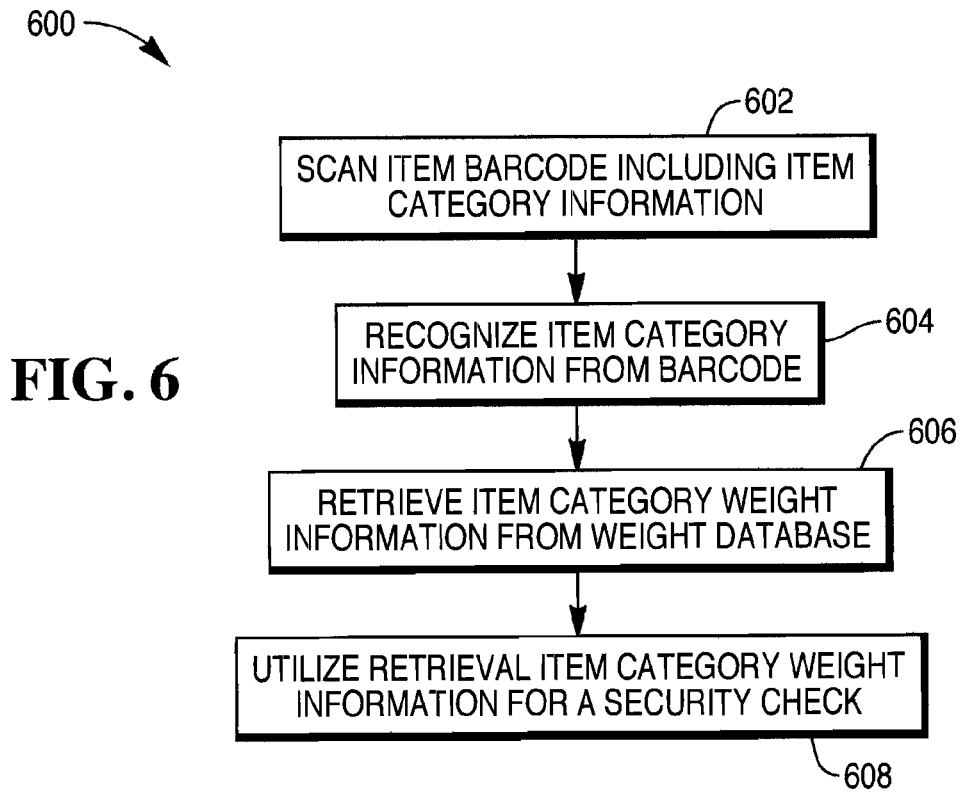
Figure 7:
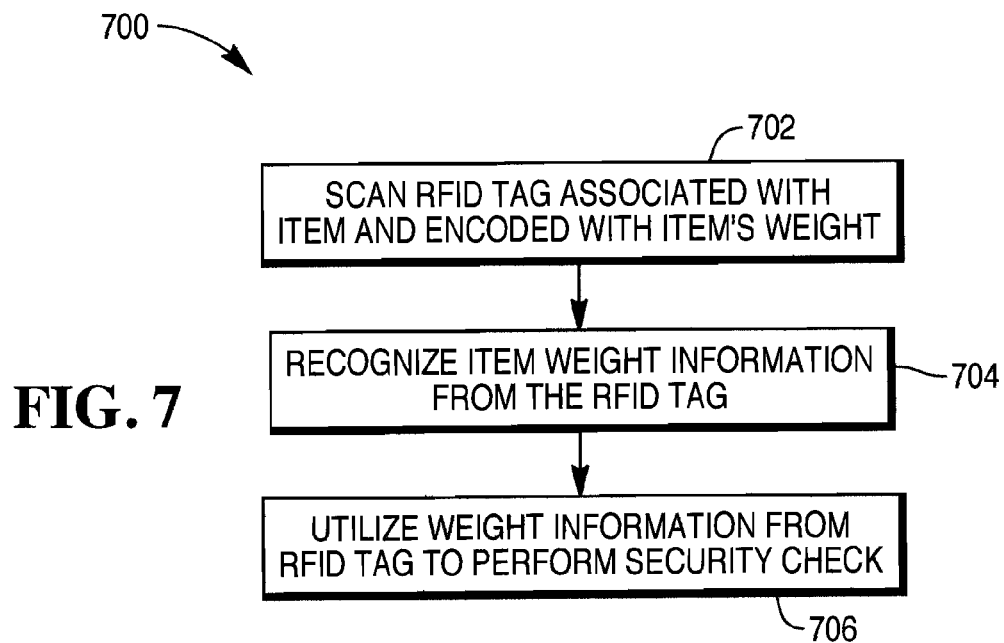

Turning to FIGS. 5-7, these figures illustrate processes 500, 600 and 700, respectively, in accordance with embodiments of the present invention. In process 500, an item is scanned in step 502, For example, a customer scans a small pair of women's jeans at a self-checkout terminal, such as terminal 10. A barcode on a price label is read by a scanner, such as scanner 14 to provide item or item category identification information. Alternatively, an RFID tag, such as tag 420, is read using RFID tag reader 39.

In step 504, it is determined whether an item weight for the scanned item is in a weight database, such as EWLDG 50 or EWLDB 300, for example, as a weight for a specific item.

If yes, in step 506, the specific item's weight, such as 1.0±0.05 for item 1 from EWLDB 300, is used for a security check.

If no, in step 508, the weight to use for a security check is otherwise determined. For example, where the jeans in the example are odd-lot jeans, the category jeans 326 may have been encoded into the barcode of the price label as discussed above. In this instance, processor 26 decodes the encoded information from the barcode and looks up the weight information, 1.25+0.75, for the category jeans 326 in EWLDB 300. Alternatively, the category may be encoded in an RFID tag, such as the tag 420 or the actual weight information may be directly encoded in a barcode or RFID tag.

Process 600 of FIG. 6 begins with step 602 in which an item barcode including item category information is scanned. In step 604, the item category information is recognized. In step 606, item category weight information is retrieved from a weight database. Finally, in step 608, the retrieved item category weight information is utilized for a security check. For example, the retrieved weight information is compared with the weight from a bagging scale, such as scale 20 of FIG. 1.

FIG. 7 illustrates a further process 700 in accordance with the present invention. In step 702 of process 700, an RFID tag associated with an item and encoded with the item's weight is scanned. In step 704, the item weight information from the RFID tag is recognized. In step 706, the weight information is used to perform a security check.

While the present invention has been disclosed in the context of various aspects of presently preferred embodiments, it will be recognized that the invention may be suitably applied to other environments consistent with the claims which follow and subsequent advances in the field. For example, while the bulk of the discussion above is in the context of self-checkout, it will be recognized that the concepts can be applied to check out systems more generally where a security weight database is employed. As a further example, while barcodes and EAS tags are described, a programmable RFID tag could be employed if cost effective. As video processing improves and becomes cost effective, products may be recognized at least in part by video analysis. Additionally, while the discussion is framed in the presently preferred content of weight, size, shape, smell, color patterns, dimensions and the like or some combination of the above may be employed for purposes of making a security check.

I claim:

1. A method for performing a checkout security test comprising:
   measuring a characteristic of a specific item at checkout;
   determining if the item characteristic is in a characteristics database as a characteristic for the specific item;
   if the item characteristic is not in the characteristics database as a characteristic for the specific item, otherwise than by said step of measuring a characteristic, determining a comparison value for the characteristic for performing a security check; and
   performing the security check with the otherwise determined comparison value.

2. The method of claim 1 where the item characteristic is item weight and the characteristics database is a weight database storing weights for specific items as well as weights for plural different items grouped by item category.

3. The method of claim 2 wherein the step of measuring a characteristic of a specific item at checkout comprises weighing the specific item with a security scale to obtain a security scale weight.

4. The method of claim 3 further comprising reading a barcode associated with the specific item encoding the otherwise determined comparison value.

5. The method of claim 3 further comprising reading an RFID tag associated with the specific item encoding the otherwise determined comparison value.

6. The method of claim 5 wherein the RFID tag is incorporated into a hard EAS tag.

7. The method of claim 3 further comprising:
   reading a barcode associated with the specific item encoding an item category; and
   utilizing the item category to obtain the otherwise determined comparison value from a weight entry for the item category stored in the weight database.

8. The method of claim 3 further comprising:
   reading a barcode associated with the specific item encoding an abstract category; and
   utilizing the abstract category to obtain the otherwise determined comparison value from a weight entry for the abstract category stored in the weight database.

9. The method of claim 3 wherein the weight database stores a mean weight along with a weight standard deviation for specific items.

10. The method of claim 3 wherein the weight database is a weight learning database (WLDB) which learns weights from repetitively scanning items sold and scanned at least a predetermined number of times, and supplemented to include weight category entries for items not sold and scanned the predetermined number of times.

11. A system for performing a checkout security test comprising:
    means for measuring a characteristic of a specific item at checkout;
    a characteristics database storing characteristics for specific items;
    means for determining if the item characteristic is in the characteristics database as a characteristic for a specific item;
    means for otherwise than by said step of measuring a characteristic, determining a comparison value for the characteristic for performing a security check if the item characteristic is not in the characteristic database as a characteristic for the specific item; and
    means for performing the security check with the otherwise determined comparison value.

12. The system of claim 11 where the item characteristic is item weight and the characteristics database is a weight database storing weights for specific items as well as weights for plural different items grouped by item category.

13. The step of claim 12 wherein the means for measuring a characteristic of a specific item at checkout comprises a security scale to obtain a security scale weight for the specific item.

14. The system of claim 13 further comprising a scanner for reading a barcode associated with the specific item encoding the otherwise determined comparison value.

15. The system of claim 13 further comprising an RFID tag reader for reading an RFID tag associated with the specific item encoding the otherwise determined comparison value.

16. The system of claim 15 wherein the RFID tag is incorporated into a hard EAS tag.

17. The system of claim 13 further comprising:
   a scanner for reading a barcode associated with the specific item encoding an item category; and
   a programmed processor utilizing the item category to obtain the otherwise determined comparison value from a weight entry for the item category stored in the weight database.

18. The system of claim 13 further comprising:
   a scanner for reading a barcode associated with the specific item encoding an abstract category; and
   a programmed processor utilizing the abstract category to obtain the otherwise determined comparison value from a weight entry for the abstract category stored in the weight database.

19. The system of claim 13 wherein the weight database stores a mean weight along with a weight standard deviation for specific items.

20. The system of claim 13 wherein the weight database is a weight learning database (WLDB) which learns weights from repetitively scanning items sold and scanned at least a predetermined number of times, and supplemented to include weight category entries for items not sold and scanned the predetermined number of times.

* * * * *